US012625356B2

(12) United States Patent
Montes Usategui et al.

(10) Patent No.: US 12,625,356 B2
(45) Date of Patent: May 12, 2026

(54) PROGRAMMABLE MULTIPLE-POINT ILLUMINATOR, CONFOCAL FILTER, CONFOCAL MICROSCOPE AND METHOD TO OPERATE SAID CONFOCAL MICROSCOPE

(71) Applicant: Universitat De Barcelona, Barcelona (ES)

(72) Inventors: Mario Montes Usategui, Barcelona (ES); Raul Bola Sampol, Barcelona (ES); Estela Martin Badosa, Barcelona (ES); Dorian Treptow, Barcelona (ES)

(73) Assignee: Universitat De Barcelona, Barcelona (ES)

( * ) Notice: Subject to any disclaimer, the term of this patent is extended or adjusted under 35 U.S.C. 154(b) by 295 days.

(21) Appl. No.: 18/510,502

(22) Filed: Nov. 15, 2023

(65) Prior Publication Data

US 2024/0126059 A1      Apr. 18, 2024

Related U.S. Application Data

(63) Continuation of application No. 17/257,233, filed as application No. PCT/EP2019/067517 on Jul. 1, 2019, now Pat. No. 11,860,349.

(30) Foreign Application Priority Data

Jul. 2, 2018      (EP) ..................................... 18382491

(51) Int. Cl.
G02B 21/00          (2006.01)
G02B 13/00          (2006.01)
(Continued)

(52) U.S. Cl.
CPC ..... G02B 21/0036 (2013.01); G02B 13/0095 (2013.01); G02B 21/0032 (2013.01); (Continued)

(58) Field of Classification Search
CPC ............ G02B 21/0036; G02B 13/0095; G02B 21/0032; G02B 21/0076; G02B 5/32; (Continued)

(56) References Cited

U.S. PATENT DOCUMENTS

| 4,799,777 A | 1/1989 | Edouard et al. |
| 4,827,125 A | 5/1989 | Goldstein |

(Continued)

FOREIGN PATENT DOCUMENTS

| JP | S58-110402 A | 7/1983 |
| JP | S60-19027 A | 1/1985 |

(Continued)

OTHER PUBLICATIONS

Japanese Office Action issued in the corresponding Japanese Patent Application No. 2020-572880, dated Mar. 29, 2023 in 5 pages including English translation.

(Continued)

*Primary Examiner* — Arnel C Lavarias
(74) *Attorney, Agent, or Firm* — Knobbe, Martens, Olson & Bear, LLP

(57)          ABSTRACT

A programmable multiple-point illuminator for an optical microscope includes a light source and a spatial light modulator (SLM). The modulated light beam can scan across a sample placed under the microscope objective, the sample being provided with fluorophores. The SLM includes a first acousto-optic deflector and a second acousto-optic deflector, the first acousto-optic deflector having a first modulation plane and the second acousto-optic deflector having a second modulation plane, said two acousto-optic deflectors being arranged in cascade. The SLM includes a telescope relay to conjugate the first modulation plane with the second modulation plane. The illuminator includes an arbitrary waveform generator that can synthesize holograms, and is (Continued)

arranged to simultaneously inject a first such hologram into the first acousto-optic deflector and a second such hologram into the second acousto-optic deflector, in order for the SLM to modulate the light beam in response to said holograms.

8 Claims, 6 Drawing Sheets

(51) Int. Cl.

| | |
|---|---|
| *G02F 1/33* | (2006.01) |
| *G03H 1/00* | (2006.01) |
| *G03H 1/08* | (2006.01) |

(52) U.S. Cl.
CPC ........... *G02B 21/0076* (2013.01); *G02F 1/33* (2013.01); *G03H 1/0005* (2013.01); *G03H 1/08* (2013.01); *G03H 2001/005* (2013.01)

(58) Field of Classification Search
CPC .. G02B 21/00; G02B 21/0004; G02B 21/002; G02B 21/0024; G02B 21/0052; G02B 21/006; G02B 21/0064; G02B 21/008; G02B 21/0084; G02B 21/06; G02B 21/36; G02B 21/365; G02B 21/367
USPC ........ 359/9, 1, 3, 15, 17, 21, 22, 29, 32, 33, 359/35, 305, 312, 362, 363, 368, 369, 359/385, 388, 389, 390
See application file for complete search history.

(56) References Cited

U.S. PATENT DOCUMENTS

| | | | |
|---|---|---|---|
| 6,038,067 | A | 3/2000 | George |
| 9,395,340 | B2 | 7/2016 | Sullivan et al. |
| 11,860,349 | B2 * | 1/2024 | Montes Usategui .... G03H 1/08 |
| 2006/0071143 | A1 | 4/2006 | Saggau et al. |
| 2011/0304900 | A1 | 12/2011 | Widzgowski et al. |
| 2017/0115547 | A1 | 4/2017 | Hartell |
| 2017/0242232 | A1 | 8/2017 | Leger et al. |
| 2024/0253157 | A1 * | 8/2024 | Laming ................ B23K 26/705 |

FOREIGN PATENT DOCUMENTS

| | | | |
|---|---|---|---|
| JP | S63-23129 | A | 1/1988 |
| JP | H01-273225 | A | 11/1989 |
| JP | H02-207212 | A | 8/1990 |
| JP | H02-503959 | A | 11/1990 |
| JP | H04-175713 | A | 6/1992 |
| JP | H06-94432 | A | 4/1994 |
| JP | 2004-199063 | A | 7/2004 |
| JP | 2008-233227 | A | 10/2008 |
| JP | 2009-506365 | A | 2/2009 |
| JP | 2009-103958 | A | 5/2009 |
| JP | 2012-212172 | A | 11/2012 |
| JP | 2013-063467 | A | 4/2013 |
| JP | 2013-534643 | A | 9/2013 |
| JP | 2015-506497 | A | 3/2015 |
| WO | 2009/063670 | A1 | 5/2009 |
| WO | 2016/059158 | A1 | 4/2016 |

OTHER PUBLICATIONS

International Search Report and Written Opinion of the International Searching Authority. International Application No. PCT/EP2019/067517 issued by the European Patent Office, mail date Oct. 25, 2019, 8 pages, Rijswijk, Netherlands.
W. Liu et al., Nonnegative Singular Value Decomposition for Microarray Data Analysis of Spermatogenesis, Proceedings of the 5th International Conference on Information Technology and Application in Biomedicine, in conjunction with the 2nd International Symposium & Summer School on Biomedical and Health Engineering, May 30-31, 2008, pp. 225-228, Shenzhen, China.
T. Suzuki et al., Development of a real-time scanning laser microscope for biological use, Applied Optics, Nov. 15, 1986, vol. 25, No. 22, The Optical Society, Washington, D.C.
D. Prather et al., Acousto-optic generation of two-dimensional spot array, Optics Letters, Nov. 15, 1991, vol. 16, No. 22, Optical Society of America, Washington, D.C.
P. Paparao et al., Generation of reconfigurable interconnections with a two-dimensional acousto-optic defelector, Applied Optics, Apr. 10, 1994, vol. 33, No. 11, The Optical Society, Washington, D.C.
D. Vuinič et al., CMOS descanning and acousto-optic scanning enable faster confocal imaging, Novel Techniques in Microscopy 2009, Apr. 26-30, 2009, Vancouver, Canada, OSA Publishing, Washington, D.C.
Office Action dated Oct. 1, 2024 in Japanese Application No. 2023-191982, 7 pages.

* cited by examiner

FIG. 5
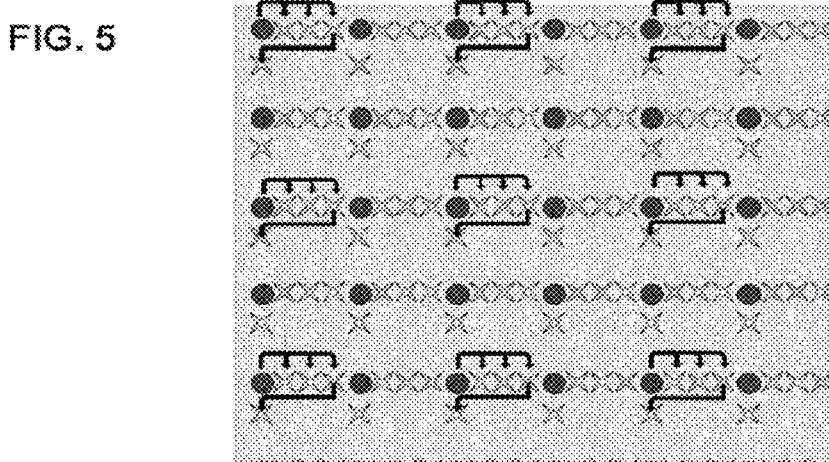
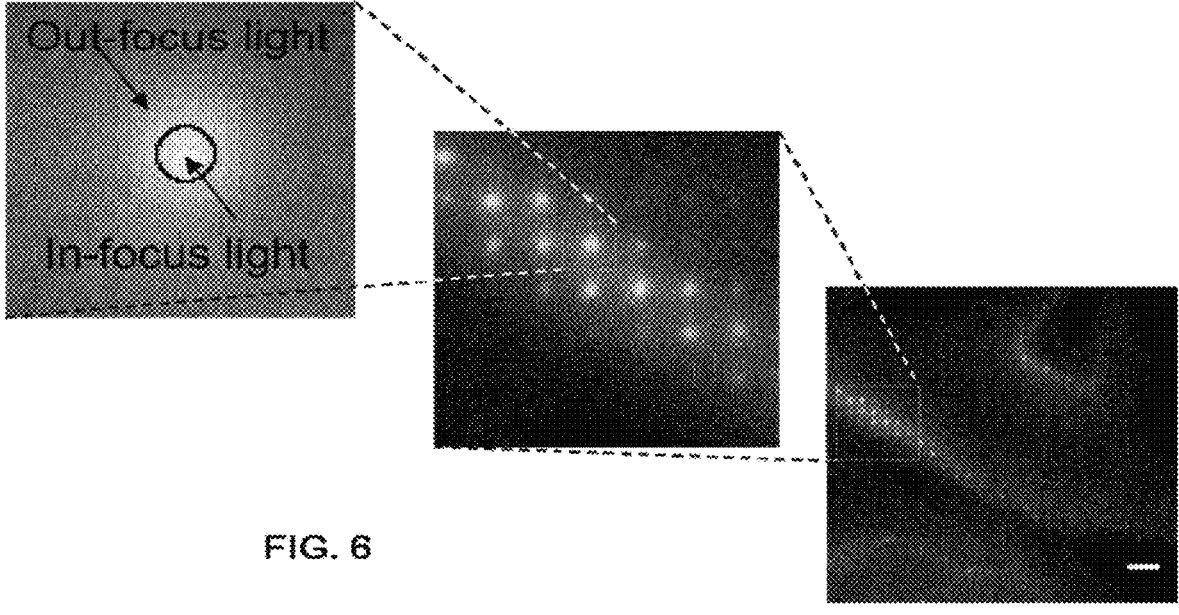
FIG. 6

FIG. 7A    FIG. 7B    FIG. 7C
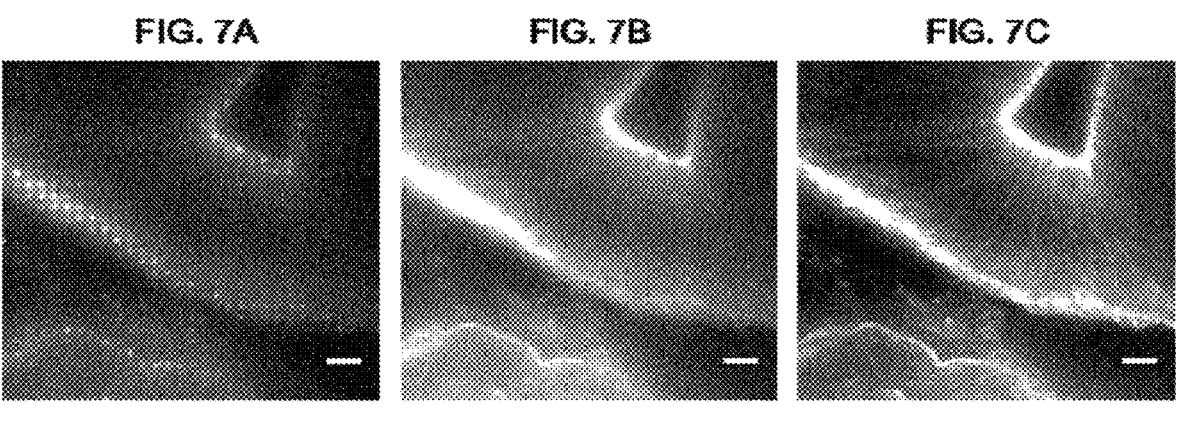
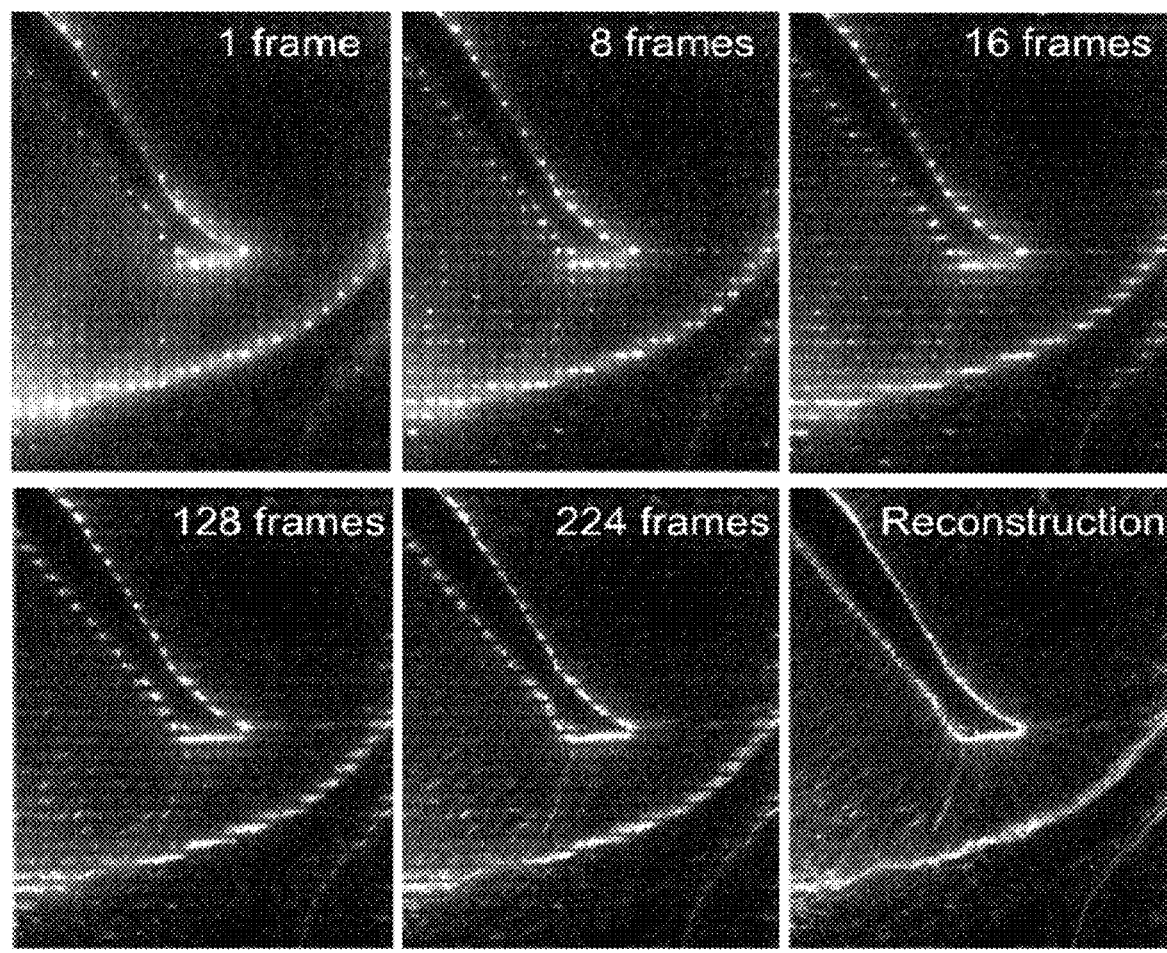
FIG. 8

PROGRAMMABLE MULTIPLE-POINT ILLUMINATOR, CONFOCAL FILTER, CONFOCAL MICROSCOPE AND METHOD TO OPERATE SAID CONFOCAL MICROSCOPE

TECHNICAL FIELD

The present disclosure is related to a programmable multiple-point illuminator for an optical microscope, and to a confocal filter to make said microscope a confocal one. The disclosure is also related to a method to operate the confocal microscope.

The illuminator comprises a light source and a spatial light modulator for modulating a light beam from the light source, the modulated light beam being intended to scan across a sample placed under an objective of the microscope, the sample being normally provided with fluorophores. The expression 'the sample is placed under the microscope objective' means that the light beam is to be focused by the objective in the sample (that expression is not to be understood as meaning that the sample is always located below the objective).

BACKGROUND ART

Confocal microscopy is the reference technique for sample visualization in all fields of cellular biology, and it is widely acknowledged as one of the most important inventions ever made in optical microscopy. Confocal microscopes have enjoyed a tremendous explosion in popularity in recent years and most universities and scientific institutions worldwide, and increasingly many individual laboratories, own confocal microscopes.

Confocal microscopes come essentially in two different modalities: single-point and multi-point scanning instruments. They are often used in combination with fluorescent tags (fluorescent molecules or fluorophores) that selectively label the structure of interest and that respond to an illumination laser by emitting light at a longer wavelength (Stokes shift). This wavelength shift permits an easy isolation of the excitation and emission optical trains by means of dichroic mirrors and filters.

Single-point confocal microscopes are based on a single laser beam that progressively scans the sample on a point-by-point basis, which results in a high resolution, high contrast and optically-sectioned image after the light emitted by the sample is filtered out by a small pinhole aperture conjugated to the laser spot. Light emitted by excited fluorophores above and below the focused plane are intercepted by the pinhole and do not reach the detector, minimizing the light haze that plagues non-confocal microscopes when imaging thick samples.

However, this point-by-point scanning method entails an obviously slow image acquisition, which is the main limitation of single-point confocals. Live samples such as cells have often to be fixed (i.e. killed) to obtain images without motion blur, as the instrument is unable to resolve the temporal dynamics of many cellular phenomena.

Faster scanning has been therefore a crucial vector in the development of modern confocal microscopy. However, scanning using a single laser spot cannot be made arbitrarily fast: a high scan rate means that the laser spot can only illuminate any sample point during a very short exposure time, in the scale of microseconds. In order to compensate for this small excitation time, the laser power falling on the sample has to be increased, which very quickly saturates the fluorophores. Laser power increments above the saturation threshold do not result in an equivalent increment in the fluorescent emission rate, in such a way that the total amount of photons reaching the detector will decrease with decreasing exposure times, thus setting a limit to the scanning speed around a few frames per second.

The only technical solution that enables a fast confocal operation is the use of several laser spots scanning the sample in parallel.

Multi-point confocals have been developed in response to this need. They use thousands of laser beamlets to simultaneously scan the sample, thus being able to reach frames rates in the range of hundreds of frames per second. An added advantage of splitting the total power into many laser foci is that these instruments are considerably gentler with the biological samples ($\frac{1}{15}$ less damaging than a single point confocal in comparable conditions), minimizing photobleaching and phototoxicity.

However, commercial implementations of the multi-point scanning principle are based on disks covered by arrays of tiny microlenses and pinholes (Nipkow disk) that spin at high speed, which make the system inflexible and optically inefficient. Indeed, spinning disk microscopes cannot scan arbitrary regions of interest in the sample and are matched to a single objective, usually with high magnification and high numerical aperture lenses. Also, a typical Nipkow disk has around 4% optical efficiency, requiring powerful excitation lasers, which are costly.

A further difficulty is the reduced confocality arising from the crosstalk between pinholes, especially in thick samples (crosstalk is due to leakage on a detected signal from other optical signals). Spurious light excited by one laser spot can reach the detector (e.g. a camera) through neighbouring pinholes, resulting in a noticeably lower resolution image when compared with that produced by a single-point confocal in the same conditions.

U.S. Pat. No. 9,395,340B2 aims to suppress optical crosstalk between illumination spots produced to inspect a sample. U.S. Pat. No. 9,395,340B2 discloses a diffractive optical element (DOE) positioned before an objective lens. The DOE makes copies of the spot output without changing the spot spacing, in order to ensure sufficient separation between spots. But U.S. Pat. No. 9,395,340B2 only envisages simple and relatively inflexible spot patterns (it discloses one programmable acousto-optic deflector just to provide an adjustable spot spacing), thus reproducing the drawbacks of the Nipkow disk to some extent.

In sum, the two modalities of confocal microscopy have clear advantages and disadvantages with respect to each other, which make them specialized and not interchangeable. In general, users need access to the two types of instrument at one time or another.

SUMMARY OF INVENTION

It is an object of the present disclosure to bridge the gap between single-point and multi-point microscopy, making it possible for laboratories to envisage unlimited operation with just one confocal microscope.

It is another object of the present disclosure to transcend conventional multi-point microscopy by creating free illumination patterns that are significantly more complex than mere spot arrays.

In a first aspect, a programmable multiple-point illuminator for an optical microscope comprises a light source and a spatial light modulator (SLM) to modulate a light beam from the light source. The modulated light beam is intended to scan across a sample placed under the microscope objective, the sample being provided with fluorophores. The SLM comprises a first acousto-optic deflector (AOD) and a second acousto-optic deflector, the first AOD having a first modulation plane and the second AOD having a second modulation plane, said two acousto-optic deflectors being arranged in cascade to provide respective modulation (i.e. deflection) in different directions (e.g. the respective directions of deflection of the two AODs may be orthogonal), whereby the spatial light modulator is enabled to scan in two dimensions across the sample. The SLM further comprises a telescope relay to conjugate the first modulation plane with the second modulation plane. The illuminator also comprises an arbitrary waveform generator (AWG) that is configured to synthesize radiofrequency (RF) signals computed with digital holography algorithms, said synthesized signals being termed holograms (such a hologram contains a coded record of an optical wave, including its amplitude and phase properties), and is arranged to simultaneously inject a first such hologram into the first AOD and a second such hologram into the second AOD, in order for the SLM to modulate the light beam in response to said holograms.

The illuminator can thus illuminate the sample with a 2D light pattern designed and chosen with a precise purpose, and so can bridge the gap between single-point and multi-point microscopy because the selected light pattern can be very simple (e.g. with a few spots) or very complex (e.g. with a dense and complicated spot arrangement), and can be analogously generated in either case.

In an example, the programmable illuminator may comprise a laser device (light source) that can dynamically project onto the microscopic sample a plurality of light spots in parallel with accurate positioning, according to an arbitrarily capricious and discretionary pattern. The programmable illuminator is based on AOD technology. AODs are essentially ultrafast light deflectors that can impart a change in the direction of a light beam that crosses the device. An AOD comprises a purposely cut optical crystal and a piezoelectric transducer that is attached at one end of the crystal and can create sound waves therein.

The modulation plane (or pivot plane) of an AOD is an imaginary plane inside the AOD crystal at which an incoming collimated light beam appears to be deflected, resulting in an outgoing collimated light beam travelling at a different angle. The modulation plane can be found by forward-projecting the propagation direction of the incoming light beam and back-projecting the propagation direction of corresponding outgoing light beam; the back and forward beams meet in a plane (the modulation plane) inside the crystal.

The two optically conjugated AODs produce a joint modulation function that is separable, i.e., it is the product of the modulation function of the first AOD (e.g. in the X direction) and the modulation function of the second AOD (e.g. in the Y direction).

It is known in the state of the art to apply a simple, sinusoidal radiofrequency (RF) signal (see FIG. 2A) to the piezoelectric transducer. The transducer vibration launches a sound signal into the crystal that spatially modulates the refractive index in a periodic way, creating a diffraction grating. By varying the frequency of the control RF signal, the period of the diffraction grating is modified and the deflection of the laser can be quickly changed in such a way that the beam can be redirected to a different spatial location.

In an example, the AWG is configured to synthesize holograms of an arbitrary complexity (see FIGS. 2B, 3 and 4), intended to enable the illuminator to scan across the sample with an arbitrarily complex two-dimensional light pattern. AWGs are able to synthesize electrical signals with arbitrary shapes, that is, in such a way that the temporal variation of the output voltage can be specified by the user in a completely general manner within the bandwidth of the instrument. In this sense, AWGs are a generalization of voltage-controlled oscillators (VCOs), which can only produce sinusoidal functions of variable frequency, and function generators, which produce several different waveforms (sine, square, sawtooth, etc.) but only within the options pre-defined by design.

In general, AWGs are composed of a digital device capable of mathematically synthetizing a waveform, such as a Field-programmable Gate Array (FPGA), and a fast digital-analog converter circuitry that eventually produces the time-varying electric signal.

In an example, the Illuminator may comprise a scanning lens arranged after the spatial light modulator to project a reconstruction of a desired illumination pattern onto an intermediate image plane, the scanning lens forming, together with a tube lens of the microscope, a 4f optical system to conjugate the modulation planes of the acousto-optic deflectors with the input pupil of the microscope objective, which is a Fourier transform lens, said objective being charged with focusing the light beam on a Fourier reconstruction plane that intersects the sample, so that the centring of the hologram is unimportant due to the shifting property of the Fourier transform.

In a second aspect, a confocal filter for an optical microscope having such an illuminator comprises an imaging sensor provided with an electronic multi-pixel detector configured to enable real-time implementation of one digital pinhole around the image of any excited fluorescence location (by virtue of the fluorophores) in the sample. The filter further comprises a relay system to focus the fluorescent light emitted by the sample on the imaging sensor.

The confocal filter, together with the programmable illuminator, makes the optical microscope actually confocal, as a digital post-processing of the image can mimic the effect of physical pinholes. For example, a CMOS image sensor, in which programmable pixel sets (e.g. rows) can be selectively read, may make image filtering fast enough.

In an example, the set of the programmable illuminator and the confocal filter may comprise means to synchronize the AWG with the imaging sensor in order to correctly compose a confocal emission image.

In a third aspect, a method to operate a confocal microscope comprising the programmable illuminator and the confocal filter comprises the steps of:

making the light source to emit a first light beam of a certain diameter;

expanding the first light beam into a second light beam having a prescribed diameter to define an illumination window on the first AOD;

injecting a first hologram into the first AOD, in order to modulate the second light beam and transform it into a third light beam;

imaging the third light beam on the second modulation plane;

collimating the third light beam at zero modulation, so that the diameter of the third light beam is that of the second light beam and defines an illumination window on the second AOD;

injecting a second hologram into the second AOD, in order to modulate the third light beam and transform it into a fourth light beam;

imaging the fourth light beam on the input pupil of the microscope objective;

focusing the fourth light beam on a reconstruction plane that intersects the sample;

collecting the fluorescent light emitted by the sample and focusing said light on the imaging sensor.

The method may further comprise the steps of:

computing the first synthetic radiofrequency signal with a first digital holography algorithm and the second synthetic radiofrequency signal with a second digital holography algorithm (although the first and second digital holography algorithms may be the same algorithm);

synthetizing, by means of the AWG, the first hologram, to be injected into the first AOD, from said first computed signal, and the second hologram, to be injected into the second AOD, from said second computed signal.

In operation, the AWG injects into the AOD cells mathematically designed, synthetic RF signals, so that the laser beam becomes additionally modified. This allows the creation of desired, arbitrarily complex light patterns in contrast to the simple deflections of conventional AODs. For example, the laser beam can be split into several sub-beams and their spatial locations can be individually controlled. This principle can be used to parallelize the illumination of a confocal microscope, similarly to what the spinning disk achieves with the perforated Nipkow disks.

The sample is scanned by shifting the array of illuminating spots until it has been fully exposed, which only requires sending new control signals to the AODs. In contrast to the spinning disk confocal microscope, the sampling patterns are herein totally programmable, as they are not based on fixed apertures etched on a solid substrate in mechanical motion.

A difficulty with this approach is the confocal filtering of out-of-focus light that cannot be done with the AODs themselves. A way to overcome this is by creating virtual pinholes, as explained above (and below, in the detailed description).

Regarding applications where the sample needs to be illuminated by a non-separable light pattern, there are disclosed herein two procedures to compose a general light distribution as a sum of several mathematically separable patterns. An important aspect to consider is that the patterns are time-multiplexed, that is, they are generated, and thus summed, by an integrating device that is sensitive to irradiance (e.g. a camera, or the sample itself), at different times. Consequently, the patterns to be added can only have positive values; subtraction can be implemented through optical means but that requires a coherent superposition that does not take place here. The disclosed algorithms are:

a) Decomposition into Lines

An instant way to decompose a two-dimensional N×M image into separable patterns is to divide it into lines (i.e. its N rows or M columns). For the sake of clarity, let us assume that we divide the image into its N rows. The image can be composed line by line if the AOD that deflects in the X direction reconstructs the line intensity and, at the same time, the AOD that modulates in the Y direction deflects that line to its appropriate Y position (these two AODs are orthogonal).

Then the driving signal of the Y-direction AOD is a continuous sinusoidal pattern, whose frequency changes incrementally and defines the reconstruction position of the line. The X-direction AOD is the hologram encoding the inverse Fourier transform of the particular line that is being reconstructed at that moment.

b) Decomposition into Separable Two-Dimensional Sub-Images: The Non-Negative Singular Value Decomposition (NNSVD)

The singular value decomposition (SVD) is a well-known factorization method that decomposes an N×M matrix A into a sum of outer products, i.e. $A = \sum_1^k \omega_i\, u_i\, v_i^T$, where k is the rank of A. Considering an image as a matrix, the SVD operation automatically produces a decomposition into separable patterns (the u and v vectors of the outer product). However, these patterns contain in general positive as well as negative values, which cannot be implemented through the AOD projection.

Fortunately, a non-negative singular value decomposition (NNSVD) can be defined and computed through an iterative algorithm as disclosed in W. Liu et al., "Nonnegative Singular Value Decomposition for Microarray Data Analysis of Spermatogenesis", Proceedings of the 5th International Conference on Information Technology and Application in Biomedicine, 225-228 (2008).

It has been found that the NNSVD algorithm is very useful to decompose images into separable sub-images to be displayed by the AOD illuminator, while compressing the image information what allows us to increase the reconstruction speed in certain cases. The algorithm approximates the diagonalization of an image A with throughout positive values, according to: $A \approx X \cdot W \cdot Y$ The diagonal matrix W consists of the eigenvalues of the diagonalization. The factor $w_{ii}$ weights the outer product of the one-dimensional vectors $x_i$ and $y_i$. When the columns x, and $y_i$ are normalized, then $w_{ii}$ represents the total power (or energy) of the decomposition sub-images. This property is useful when determining the significance of a sub-image. Sub-images with a negligible intensity may be discarded to accelerate the reconstruction and to improve the efficiency.

BRIEF DESCRIPTION OF DRAWINGS

Non-limiting examples of the present disclosure will be described in the following, with reference to the appended drawings, in which:

FIG. 5 shows an array of light spots;

FIG. 6 illustrates a confocal filtering;

FIGS. 7A-7C show a comparison between three imaging results;

FIG. 8 shows a comparison between six image reconstructions;

DESCRIPTION OF EMBODIMENTS

Figure 1:
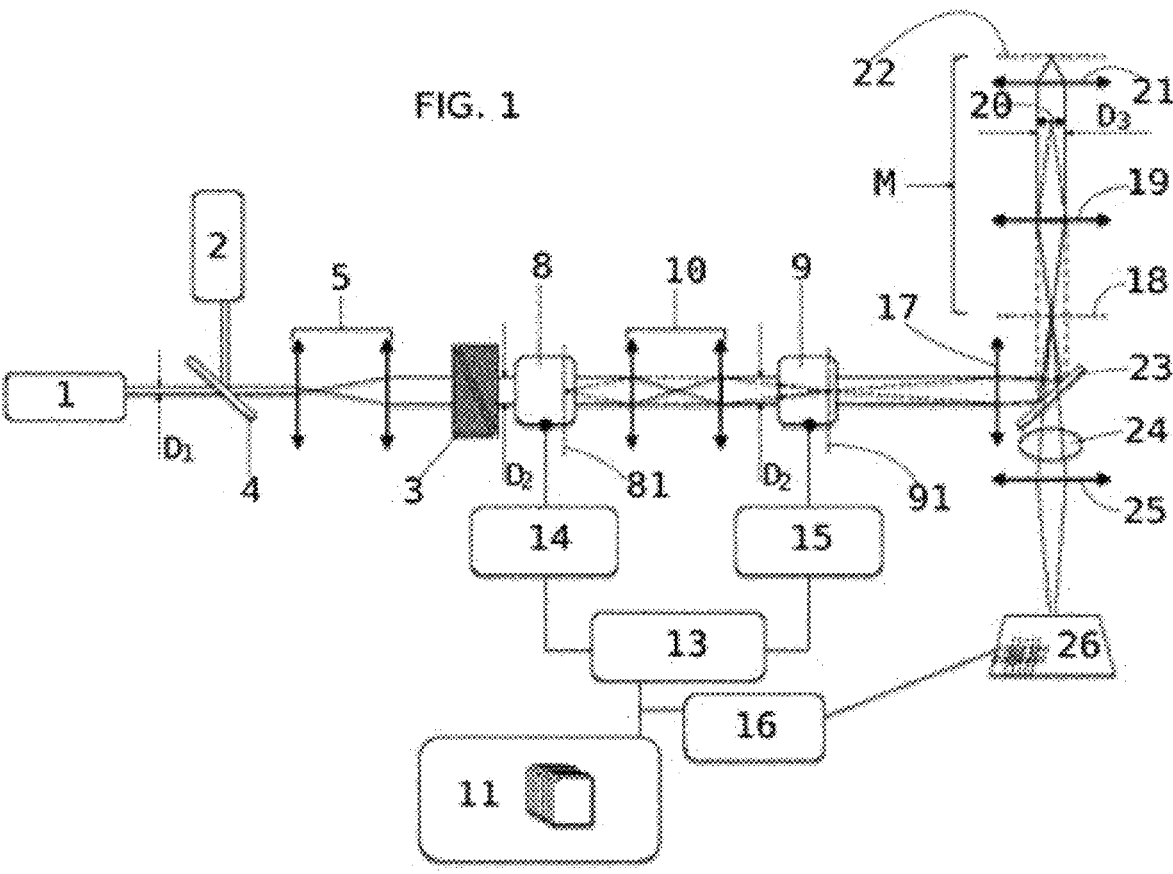
FIG. 1 shows a setup for an optical microscope M.

FIG. 1 shows an illumination system comprising a first laser source 1 and a second laser source 2, a dichroic device 4 to couple respective beams from the laser sources into a single direction, a first acousto-optic deflector (AOD) 8, an inverted telescope 5 before the first AOD 8, a second AOD 9, a telescope relay 10 between the first AOD 8 and the second AOD 9, and a scanning lens 17 after the second AOD 9.

FIG. 1 also shows the following parts of an optical microscope M: a tube lens 19 and an input pupil 20 to an objective lens 21 (the microscope objective).

The illumination system of FIG. 1 further comprises an arbitrary wave generator (AWG) 13, a first radiofrequency (RF) amplifier 14 in the way from the AWG 13 to the first AOD 8, a second radiofrequency (RF) amplifier 15 in the way from the AWG 13 to the second AOD 9, a two-dimensional (2-D) imaging sensor 26, a synchronizer 16 between the imaging sensor 26 and the AWG 13, a relay system 25 before the imaging sensor 26, a fluorescence filter 24 before the relay system 25, and a dichroic mirror 23 between the tube lens 19 and the fluorescence filter 24 (the dichroic mirror 23 is also located between the scanning lens 17 and the tube lens 19).

Any laser source 1 or 2 can be either continuous or pulsed. Pulsed lasers (femtosecond) can be used to cause a multi-photon absorption phenomenon on a reconstruction plane with a view to excite fluorescence or induce photo-polymerization in some applications. When a pulsed laser is used as the illumination source, additional optical elements, such as a prism 3, can be used to avoid or compensate large group velocity dispersion inside the AODs. In contrast, continuous-wave (CW) lasers emit one, uninterrupted light beam, and are preferable for general fluorescence microscopy as they have much lower peak-power values than pulsed or ultrafast lasers, which may be detrimental to the samples, and present a simpler design that make them easier to manufacture and maintain.

In general, several laser sources can provide illumination at selected wavelengths for polychromatic applications, either simultaneously or sequentially, and can be coupled into a single direction by means of the dichroic device 4. For example, several light sources are necessary for excitation in multi-colour microscopy, in which at least two fluorescent molecular dyes are used to label different sample structures. Upon laser irradiation, these structures emit light within distinct wavelength ranges so that they can be individually visualized. Moreover, two lasers with different wavelengths may be necessary for the excitation and depletion stages in super-resolution techniques such as STED (stimulated emission-depletion) or RESOLFT (reversible saturable optical fluorescence transitions) microscopies. Besides, multiple lasers can be used to study the co-localization, within the same biological structure, of two or more molecular species, which are made visible by labelling dyes that respond to the different excitation wavelengths.

In operation, the single or combined laser beam is expanded by the inverted telescope 5 from an initial laser diameter $D_1$ to an illumination window of diameter $D_2$ on the first AOD 8. The size $D_2$ of said illumination window, and therefore the magnification of the beam expander 5, is carefully selected as this controls the field of view versus the frame rate trade-off of the illumination system.

The two AODs 8 and 9 provide modulation of the light beam in two orthogonal directions (X and Y), that is, they constitute a spatial light modulator. These AODs are high-resolution, high-deflection angle devices (preferably providing higher than 500×500 resolvable spots), with a large square input window of preferably more than 8×8 mm, and with as similar as possible acousto-optic properties. When illuminated by several lasers, the AODs are configured to work in the Bragg regime simultaneously for the whole set of wavelengths involved.

Furthermore, when addressed by specific sets of RF signals within the bandwidth of the AOD device, the two AODs must provide an overlapping deflection range for the whole set of wavelengths. The AODs are mounted on tip-tilt opto-mechanical mounts (not shown) to be oriented in appropriate angles to the incoming laser beam, in order to achieve good diffraction efficiency for the whole bandwidth and for any wavelength involved.

The two orthogonal AODs are optically conjugated by the telescope relay 10, which comprise two identical lenses in a 4f configuration to image the modulation plane 81 of the first AOD 8 (i.e. the pivot plane of the beam deflection) into the modulation plane 91 of the second AOD 9 with unit magnification. Furthermore, the relay 10 simultaneously keeps the laser beam collimated (at zero modulation) with diameter $D_2$ at an illumination window on the second AOD 9. The two optically conjugated AODs then achieve an optical multiplication of their modulation functions as follows: h(x,y)=f(x)·g(y) (see FIG. 3), without any distortion caused by light propagating from the first AOD 8 to the second AOD 9.

The AOD devices are connected to a dual-channel arbitrary waveform generator (AWG) 13 through radio-frequency (RF) amplifiers 14 and 15. The AWG digitally synthetizes two, usually discrete, RF signals computed with techniques of digital holography. These synthetic pixelated radio signals (see FIG. 3A) induce a complex spatial variation of the refractive index inside the AOD cells, by means of the acousto-optic effect, which in turn modulate the light beam in a way akin to a Fourier spatial light modulator. As a result, the complex refractive index modulation becomes an acoustically induced hologram.

The AWG 13 can produce signals with a bandwidth matching that of the AOD devices (8, 9) and incorporates a memory bank capable of storing enough pre-computed driving signals to jointly represent complex light patterns. In effect, in contrast to a true two-dimensional spatial light modulator, the AOD device described herein comprises two one-dimensional light modulation devices in cascade, which can only produce two-dimensional light patterns that are mathematically separable (i.e., which are the product of a function in X by a function in Y, h(x,y)=f(x)·g(y), see FIG. 3). This is usually enough to implement excitation patterns consisting of light spot arrays that can scan the sample in parallel (as explained above, the sample is placed under the objective 21 of microscope M).

When the illuminator is needed to project more complex light patterns (to excite an arbitrary region of interest, for opto-stimulation or photobleaching, for example), these can be obtained by series decomposition into separable functions through an appropriate mathematical algorithm (represented by ref. 11 in FIG. 1), i.e.: H(x,y)=$\Sigma_i$ h$_i$(x,y)=$\Sigma_i$ f$_i$(x)·g$_i$(y).

The sample itself, through a cumulative effect, will add up the series terms (or the final detector in other applications, usually through synchronization (ref. 16) with the AWG 13).

In either case, in order to correctly form the desired light pattern, one must consider that the optical modulation within the AOD devices is produced by travelling sound waves, which propagate from the piezoelectric transducer at one end of the acousto-optic crystal to a sound absorber at the other end, interacting with the laser beam within a finite time interval when crossing the illuminated optical window of the AOD. This necessarily requires that the reconstruction be carried out at a Fourier plane with respect to the conjugated modulation planes (81 and 91) of the two AODs 8 and 9, so that the centring of the hologram is unimportant due to the shifting property of the Fourier Transform. In order to do this, the modulation planes need to be conjugated with the input pupil 20 of the microscope objective 21, that will act here as a Fourier transform lens.

First of all, the scanning lens 17 projects a reconstruction of the desired excitation pattern into an intermediate image plane 18. This scanning lens 17, together with a tube lens 19 of the microscope M, form a 4-f system that optically conjugates the modulation planes 81 and 91 (which are in turn mutually conjugated by the telescope relay 10) with the input pupil 20 of the microscope objective 21, which focuses the laser beam on a final reconstruction plane 22 that intersects the sample (not shown), thereby exciting the fluorescence of the sample (i.e. the fluorophores therein).

The field of view of the microscope objective 21 (which is a Fourier transform lens) must be larger than the inclinations of the highest spatial frequency Fourier components contained in the displayed holograms. Pupil matching may be necessary in order to avoid vignetting of said Fourier components inside the microscope objective 21. Since the microscope objective 21 must be, in general, a highly corrected optical system composed of several optical surfaces, its input pupil 20 may lie inside the system and not be directly accessible. Since the modulation planes 81 and 91 also lie inside the AOD devices 8 and 9, respectively, the relay system formed by the scanning lens 17 and the tube lens 19 is used to couple the modulations planes to the input pupil 20 of the microscope objective 21.

Additionally, the scanning lens 17 plus the tube lens 19 match the input pupil size $D_3$ with the AODs optical window size $D_2$, in order to use the full numerical aperture of the microscope objective 21 and thereby optimizing the sectioning capability and resolution. The ratio $D_3/D_2$ then determines the magnification of the telescopic system formed by the scanning and tube lenses 17 and 19, thus the deflection angles of the Fourier components of the wavefronts diffracted by the AODs and, consequently, the field of view of the illuminator on the sample plane. As the time $\tau$ that the sound wave needs to cross the illuminated window is $\tau=D_2/v$, where v is the speed of sound in the crystal, $D_2$ is also related to the maximum repetition rate at which holograms can be updated (i.e. the maximum frame rate of the illuminator), so that it should be carefully selected.

The fluorescent light emitted by the sample, travelling in the opposite direction to the excitation laser, is collected by the microscope objective 21 and focused onto the intermediate image plane 18. After this, the dichroic mirror 23 and the fluorescence filter 24 select the emission wavelength, and the relay system 25 focuses the emission light on the 2D imaging sensor 26. Electronic post-processing of several individual frames obtained by shifting the multi-spot illumination array in an orderly fashion (see FIG. 5) can produce a final confocal image as illustrated in FIGS. 6 and 7. A precise synchronization (16) between the sensor 26 and the AWG 13 is necessary for correctly composing the final image.

The imaging sensor may be a CMOS multi-pixel detector that allows arbitrary reading regions at high speeds enabling the real-time implementation of digital masks (digital pinholes) around each emission focus. Different algorithms that improve both lateral and axial resolution, such as photon reassignment, can also be implemented.

Figure 3A:
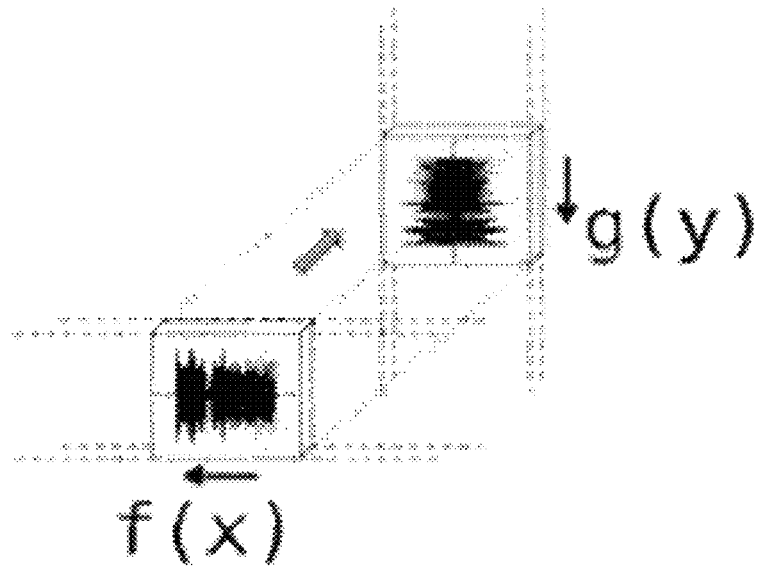
FIGS. 3A and 3B represent a 2D acousto-optic deflector.
Figure 3B:
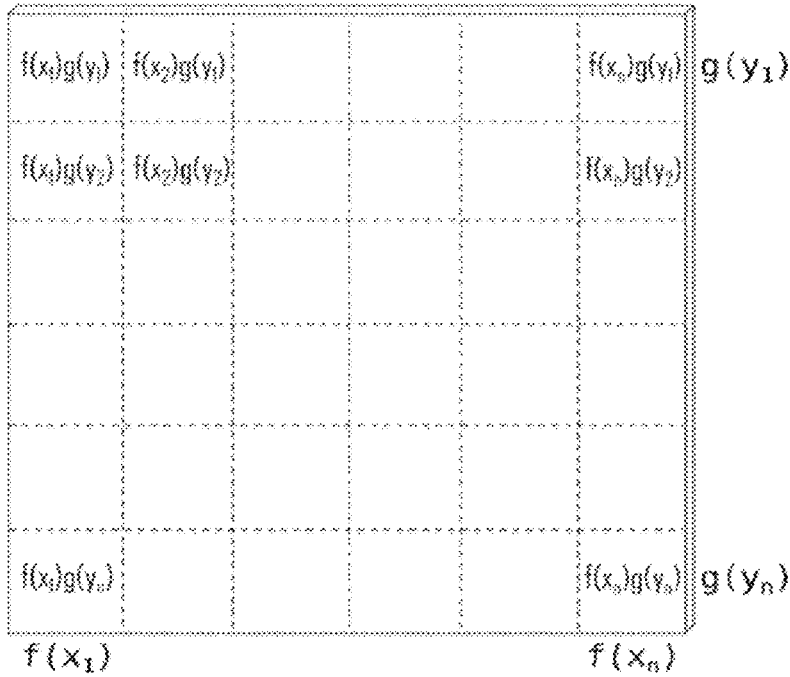

FIGS. 3A and 3B illustrate the formation of a two-dimensional modulation pattern out of two one-dimensional modulation signals injected into orthogonal AOD cells. As the two AOD devices are conjugated through the relay 10, the first, X-varying, modulation plane is projected into the second, Y-varying, modulation plane. The result is an outer vector multiplication of the discrete signals encoded in the two planes.

Figure 4:
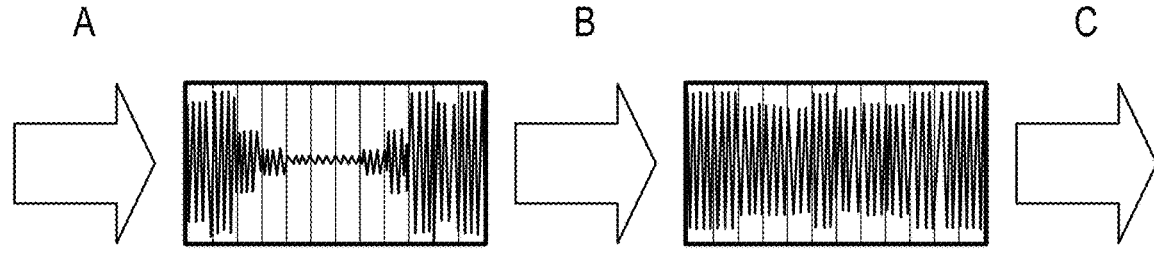
FIG. 4 shows a comparison between two holograms.

FIG. 4 illustrates the last steps in the synthesis process of the holographic radiofrequency signals that are injected into the AOD cells. Firstly (and not shown in FIG. 4), the illumination patterns are described with digital data arrays. The index of each array element represents the position of the physical illumination spot in the sample plane, and the value of each array element represents its intensity accordingly. If the illumination pattern I(x,y) is separable, it can be described by the multiplication of two discrete functions $I(x,y)=I_1(x)\cdot I_2(y)$. If this is not the case, a decomposition following the procedures disclosed above may be carried out.

As the laser beam wavefront is modulated by the AODs and then transformed into the desired illumination pattern by an optical Fourier transform, the calculation of the required wavefront modulation can be performed via an inverse Fourier transform of the illumination pattern. Since the illumination pattern is described digitally, the required amplitude and phase modulation may be calculated by the discrete Fourier transform (DFT). The position of the illumination pattern elements (spots) is controlled by the frequencies at which the DFT is evaluated.

In order to obtain the required spatial amplitude and phase modulation by the AODs, an electronic driving signal is required that arouses the corresponding acousto-optic modulation in the AOD crystal. Finally, the relationship between the driving RF signal and the resulting spatial amplitude and phase modulation is simple: a piecewise defined sinusoidal driving signal with a carrier frequency $f_c$, and piecewise varying amplitude and phase corresponding to the calculated amplitude and phase results (to a good approximation) in the desired wavefront modulation (ref. A in FIG. 4).

Additionally, an iterative Gerchberg-Saxton algorithm (ref. B in FIG. 4) is preferably used to convert the full-complex hologram (left graph in FIG. 4) into a kinoform (or phase-mostly hologram, right graph in FIG. 4) in order to maximize the optical efficiency. The typical result of the RF frequency synthetized by this procedure is shown in the right graph of FIG. 4, which represents a high-efficiency hologram (the left graph of FIG. 4 represents a relatively low-efficiency hologram) that is injected into one AOD 8 or 9 (ref. C in FIG. 4).

Figure 2A:
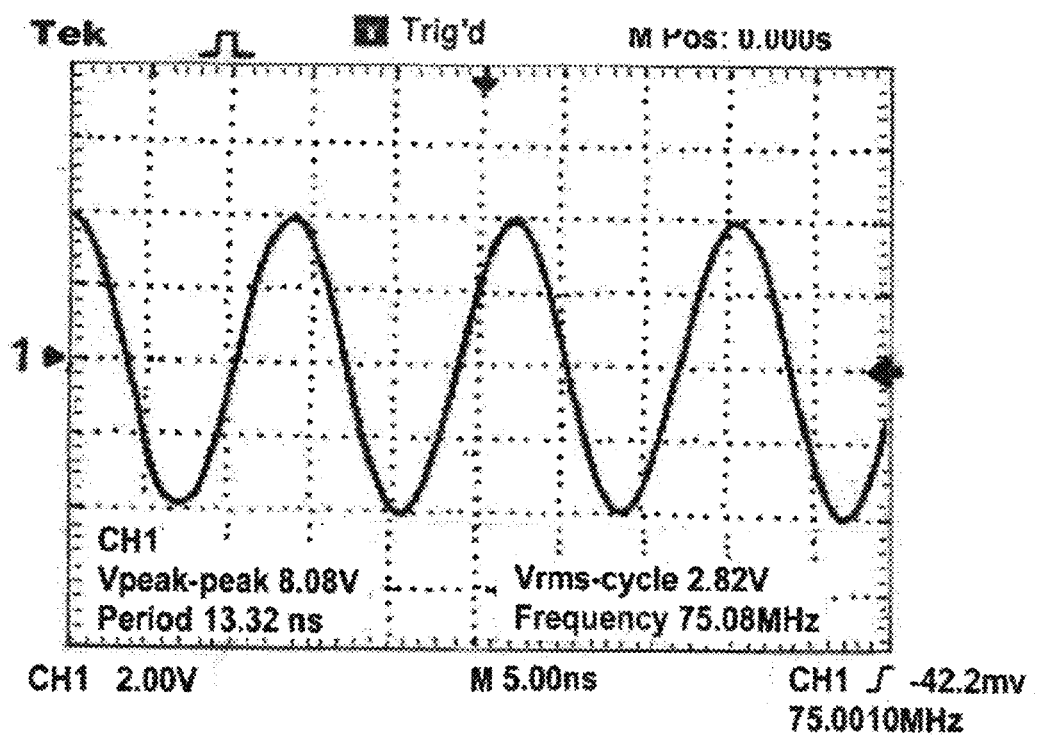
FIGS. 2A and 2B show a comparison between two radiofrequency signals.
Figure 2B:
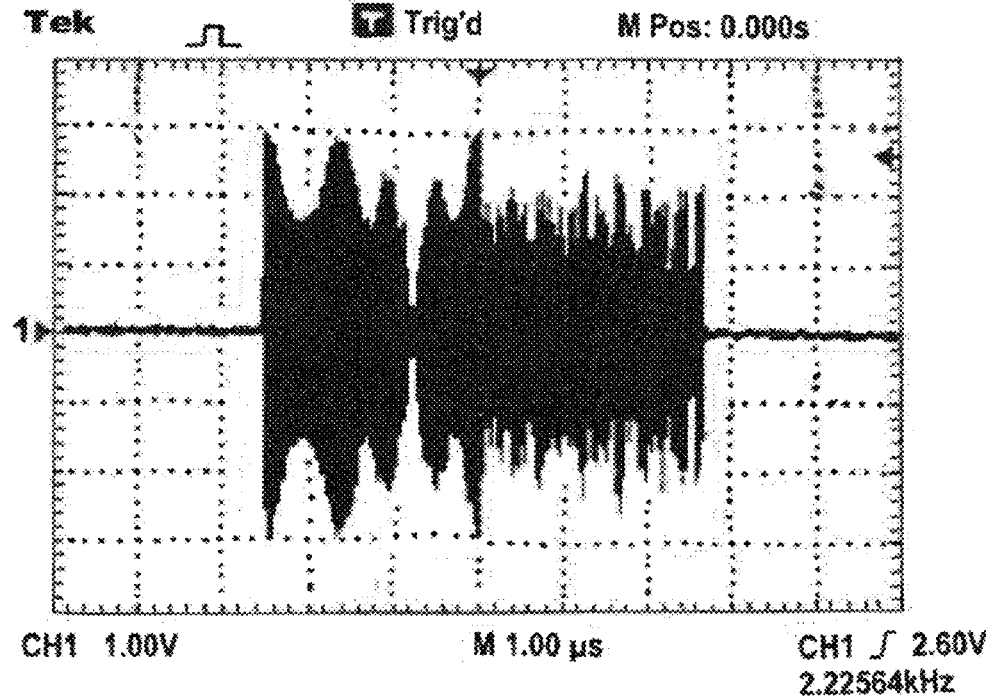

FIG. 2A shows an oscilloscope trace of a pure sinusoidal RF signal of a frequency=75 MHz that typically drives AODs when used as a beam deflector. FIG. 2B, by contrast, shows a much more complex signal computed with the techniques of digital holography explained above, designed to produce the arbitrary light distributions disclosed herein.

By means of this holographic RF signals, arbitrary light distribution can be obtained on the reconstruction plane 22. When the illuminator of the present disclosure is used to excite fluorescence from a microscopic specimen, a convenient pattern is formed by a regular array of light spots (for example, a square matrix of 32×32 light spots). The array can be incrementally shifted, by changing the X and Y holograms, until the sample becomes fully exposed, as illustrated in FIG. 5. The whole sample plane can be scanned by an illumination pattern consisting of a regular array of light spots that is incrementally shifted horizontally and vertically until the gaps between spots are filled. The shift increment can be selected as the radius of the individual light spots in agreement with Rayleigh criterion.

In other words, the increment in the X and Y directions can be selected according to the resolution of the optical system, i.e. matching the radius of the point-spread function at the reconstruction plane 22 (for example, 16×16 shifts). The specimen (in the sample) emits fluorescence in response to the individual excitation spot arrays, which is captured by the sensor 26 in synchrony (16) with the AWG 13.

FIG. 6 illustrates one of the emitted fluorescence images in response to the illumination light. The magnified inset shows that the resulting image is also an array of light spots, whose intensity is related to the local density of fluorescence molecules at the focal plane and which is surrounded by a cloud of scattered light mostly coming from out-of-focus planes. This scattered light, if not eliminated, greatly reduces the contrast and resolution of the final image, as illustrated in FIG. 7. Confocal filtering is carried out in the single emission frames. Fluorescent photons coming from planes above and below the plane of interest produce halos of light around the excitation foci, which can be eliminated by digitally processing the images: only the information inside a small circle around each light spot is kept, the rest of the image is erased.

FIG. 7 shows again an individual response of the specimen to one of the excitation spot arrays. There are shown fluorescent images of the actin network in a chicken embryo immunolabeled with phalloidin+TRITC. From left to right: single emission frame (the excitation pattern consists of an square array of 32×32 laser spots, FIG. 7A), widefield (non-confocal) image (FIG. 7B), confocal image obtained after pinhole filtering and addition of the whole set of single emission frames (FIG. 7C).

If the final image is composed as the addition of these individual responses, without filtering the out-of-focus light, the image in FIG. 7B results. By contrast, if the individual fluorescence frames are digitally pinholed, by keeping only the light within a small circle around the excitation foci (see the rightmost image in FIG. 6) before the final composition, FIG. 7C results, which clearly shows improved resolution and contrast. The spot array illumination permits this operation to be carried out, which justifies its use.

FIG. 8 shows the reconstruction of a fluorescent image following the scheme of alternatively capturing the fluorescence, filtering the out-of-focus light and shifting the illumination pattern to a new position according to the layout in FIG. 5. The quality of the final reconstructed image is comparable to that produced by traditional confocal microscopes based on physical pinholes. The reconstruction of the final image as a sum of digitally pinholed emission frames. The excitation spot array is shifted to 16×16=256 locations that jointly, completely scan the sample.

Figure 9:
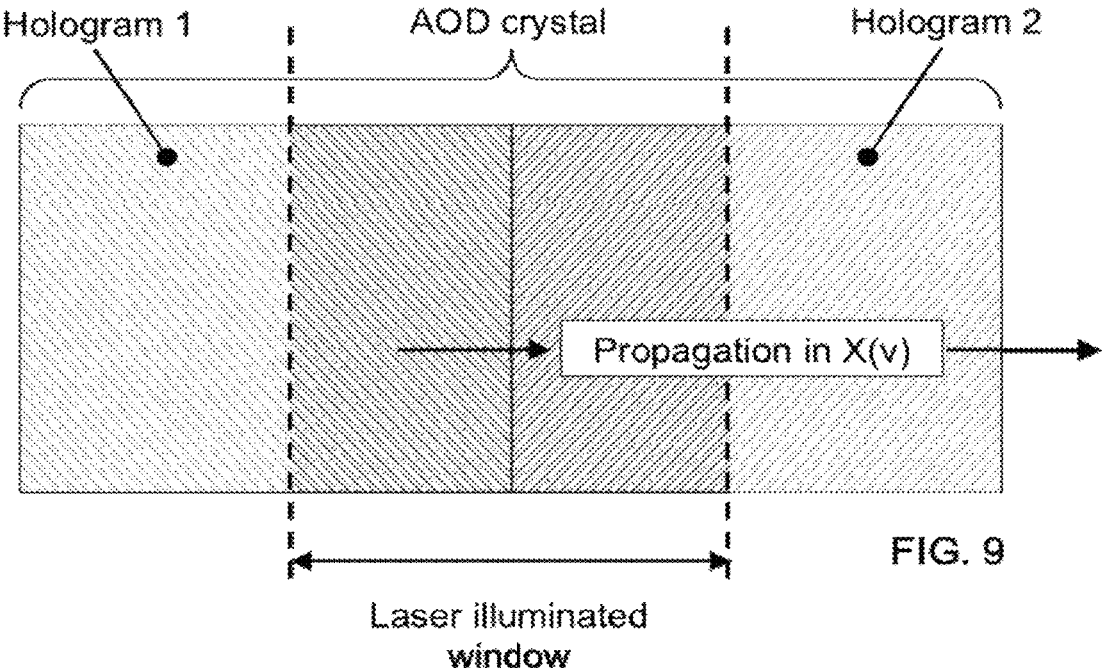
FIG. 9 shows a hologram transition.

FIG. 9 illustrates an issue that arises when several holograms need to be displayed in a sequence (for instance, in a separable decomposition). Firstly, holograms need to be repeated by the AWG 13 a number of cycles in a row before switching to the next hologram in the series, in order for them to modulate the light beam efficiently. In effect, if the travelling holograms are displayed just once, they are only correctly reconstructed at a single point in time: when the hologram fully traverses the optical window. Before that point, it is only partially displayed as it is still travelling through the exposed laser area. After that point, the first hologram starts to leave the illuminated area and the subsequent hologram starts to be displayed (FIG. 9), partially sharing the AOD window temporarily, which causes crosstalk. The diffraction patterns that are generated during the transitions between consecutive holograms reduce the reconstruction quality.

On the contrary, the reconstruction is optimal while the signal of one hologram is continuously repeated, since the circular shifts produced by the travelling nature of the hologram (the repetition makes the fraction of the hologram that disappears from one end of the illuminated window apparently reappear through the other end), do not affect the reconstruction because of Fourier transform properties.

In order to solve this difficulty, each hologram signal may be repeated a finite number of instances to ensure a reasonable reconstruction time. The ratio between the total time that a single hologram is displayed and the transition time between two holograms determines the reconstruction quality. As an additional measure one can introduce a blank signal period separating each pair of hologram repetitions in order to totally suppress the transient mixing. However, the reconstruction time is increased when more repetitions and blanking periods are used, so a trade-off between frame rate and quality has to be made corresponding to the need of the application.

An additional issue with hologram sequences is related to an incorrect multiplication of the X and Y holograms. Note that both the X and Y windows will be displaying the two consecutive holograms during the hologram transitions (X-hologram 1 and X-hologram 2 on AODx 8, and Y-hologram 1 and Y-hologram 2 in AODy 9), wrong products (between X-hologram 1 and Y-hologram 2, and between X-hologram 2 and Y-hologram 1) will be formed. If the X and Y sequences are synchronized this effect is minimized.

However, depending on several factors, such as a differential sound speed in the two AO crystals or the spatial centring of the illuminated areas in the two AOD devices, the RF signals (which are injected simultaneously into the two devices) will produce travelling holograms that will reach the laser beam at two different times.

This has the effect to temporarily extend the transient period in which the hologram in the X-axis multiplies the wrong hologram in the Y-axis (the first X hologram in the sequence multiplies the second Y hologram in the sequence, for example). Therefore, failing to align the holograms induce artifacts in the final reconstructed image.

Figure 10:
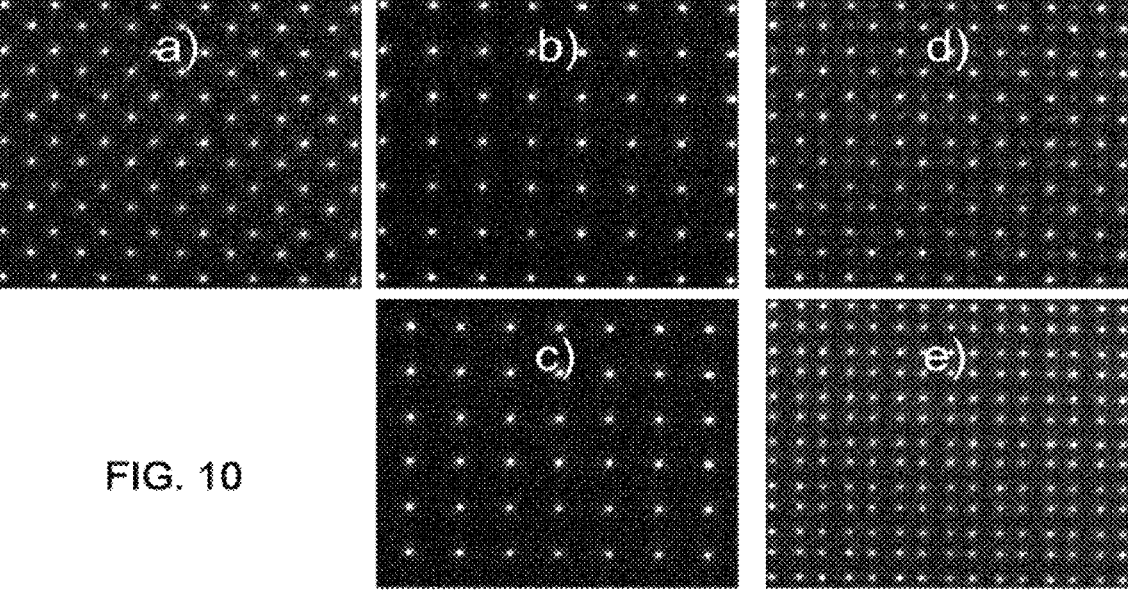
FIG. 10 shows a comparison between different phase alignments.

Thus an important feature of the AWG 13 may be to incorporate the means to advance or delay the hologram sequence in one channel relative to the other (a relative phase delay control) in order to compensate for these acoustic path differences in the AOD cells so that one can accurately align the signal of AODx 8 to that of AODy 9, as illustrated in FIG. 10.

Triangular spot patterns are not separable. However, one can compute separable holograms that when repeated indefinitely produce the spot patterns in FIG. 10b and FIG. 10c.

When these two same holograms are displayed in a sequence during the integration time of the camera, considering repetitions and blanking periods as discussed above, and with the appropriate phase delay between the two AWG channels, FIG. 10a shows a non-separable triangular spot array correctly formed. By contrast, FIG. 10d and FIG. 10e show incorrect reconstructions of the triangular spot array with settings for the phase delay that do not pre-compensate for the actual acoustic path differences in the setup.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

What is claimed is:

1. A programmable multiple-point illuminator for an optical microscope, comprising:

one continuous laser or a plurality of continuous wave lasers coupled into a single light beam, the lasers being configured to emit uninterrupted light beams; and a spatial light modulator to modulate a single or combined light beam from the continuous wave lasers to produce a modulated light beam configured to scan across a sample placed under an objective of the microscope, the sample being provided with fluorophores, the spatial light modulator comprising:

a first acousto-optic deflector; and a second acousto-optic deflector, the first acousto-optic deflector having a first modulation plane, and the second acousto-optic deflector having a second modulation plane, said first and second acousto-optic deflectors being arranged in cascade to provide respective deflection in different directions, the spatial light modulator being configured to scan in two dimensions across the sample, the first and second modulation planes being conjugated with an input pupil of the objective of the microscope, the illuminator further comprising:

a waveform generator configured to synthesize holograms and arranged to simultaneously inject a first such hologram into the first acousto-optic deflector and a second such hologram into the second acousto-optic deflector, for the spatial light modulator to modulate the single or combined light beam in response to said holograms, the objective of the microscope acting as a Fourier transform lens with respect to the conjugated modulation planes and focusing the single or combined light beam on a Fourier reconstruction plane that intersects the sample.

2. The illuminator according to claim 1, wherein the first and second acousto-optic deflectors are high-resolution, high deflection angle devices.

3. A confocal filter for an optical microscope having the illuminator of claim 1, comprising an imaging sensor provided with an electronic multi-pixel detector configured to enable real-time implementation of one digital pinhole around an image of any excited fluorescence location in the sample, further comprising a relay system to focus a fluorescent light emitted by the sample on the imaging sensor.

4. A confocal microscope comprising the confocal filter of claim 3, further comprising means to synchronize the waveform generator with the imaging sensor in order to correctly compose a confocal emission image.

5. A method of operating the confocal microscope of claim 4, comprising:

making the single or combined continuous wave lasers to emit a first light beam of a certain diameter ($D_1$);

expanding the first light beam into a second light beam having a prescribed diameter ($D_2$) to define an illumination window on the first acousto-optic deflector;

injecting a first hologram into the first acousto-optic deflector to modulate the second light beam and transform it into a third light beam;

imaging the third light beam on the second modulation plane;

collimating the third light beam at zero modulation, so that the diameter ($D_2$) of the third light beam is that of the second light beam and defines an illumination window on the second acousto-optic deflector;

injecting a second hologram into the second acousto-optic deflector to modulate the third light beam and transform it into a fourth light beam;

imaging the fourth light beam on the input pupil of the microscope objective;

focusing the fourth light beam on the Fourier reconstruction plane that intersects the sample;

repeating the first and second holograms a number of cycles in a row before switching to another hologram, to prevent the first and second holograms to be only partially displayed when traveling through their respective illumination windows; and collecting the fluorescent light emitted by the sample and focusing said light on the imaging sensor.

6. The method according to claim 5, further comprising introducing a blank period before switching to another hologram.

7. The illuminator according to claim 2, wherein the high-resolution, high deflection angle devices provide higher than 500×500 resolvable spots.

8. The method according to claim 5, wherein no action is taken to center the first and second holograms.

* * * * *